US011714495B2

(12) United States Patent
Bosch et al.

(10) Patent No.: US 11,714,495 B2
(45) Date of Patent: *Aug. 1, 2023

(54) FINGER DEVICES WITH ADJUSTABLE HOUSING STRUCTURES

(71) Applicant: Apple Inc., Cupertino, CA (US)

(72) Inventors: Erin M. Bosch, San Jose, CA (US); Stephen E. Dey, Capitola, CA (US); Jeffrey A. Griffis, San Carlos, CA (US); Alex J. Lehmann, Redwood City, CA (US); Yuhao Pan, Sunnyvale, CA (US); Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,765

(22) Filed: Sep. 1, 2022

(65) Prior Publication Data

US 2022/0413626 A1 Dec. 29, 2022

Related U.S. Application Data

(63) Continuation of application No. 17/465,579, filed on Sep. 2, 2021.

(Continued)

(51) Int. Cl.
*G06F 3/033* (2013.01)

(52) U.S. Cl.
CPC ...... *G06F 3/033* (2013.01); *G06F 2203/0331* (2013.01)

(58) Field of Classification Search
CPC .......... G06F 3/017; G06F 3/014; G06F 3/033; G06F 2203/0331
See application file for complete search history.

(56) References Cited

U.S. PATENT DOCUMENTS

| 5,581,484 A | 12/1996 | Prince |
| 5,631,861 A | 5/1997 | Kramer |

(Continued)

FOREIGN PATENT DOCUMENTS

| CN | 104049739 A | 9/2014 |
| CN | 104281257 A | 1/2015 |

(Continued)

OTHER PUBLICATIONS

Hutson, Finger devices let users 'touch' virtual objects, Science, AAAS, Apr. 25, 2017, 4 pages.

(Continued)

*Primary Examiner* — Hang Lin
(74) *Attorney, Agent, or Firm* — Treyz Law Group, P.C.; Kendall P. Woodruff

(57) ABSTRACT

A finger device may be worn on a user's finger and may serve as a controller for a head-mounted device or other electronic device. The finger device may have a housing having an upper housing portion that extends across a top of the finger and first and second side housing portions that extend down respective first and second sides of the finger. Sensors in the side housing portions may measure movements of the sides of the finger as the finger contacts an external surface. To ensure that the sensors are appropriately positioned relative to the sides of the finger, the housing may include one or more adjustable structures such as an elastomeric band, a drawstring, a ratchet mechanism, a scissor mechanism, and/or other adjustable structures for adjusting the position of the first and second side housing portions and associated sensors relative to the upper housing portion.

20 Claims, 9 Drawing Sheets

Related U.S. Application Data

(60) Provisional application No. 63/078,216, filed on Sep. 14, 2020.

(56) References Cited

U.S. PATENT DOCUMENTS

| | | | |
|---|---|---|---|
| 6,388,247 | B2 | 5/2002 | Asada et al. |
| 8,368,641 | B2 | 2/2013 | Tremblay et al. |
| 8,610,548 | B1 | 12/2013 | Provancher |
| 8,724,861 | B1 | 5/2014 | Sun |
| 8,994,827 | B2 | 3/2015 | Mistry et al. |
| 9,104,271 | B1 | 8/2015 | Adams et al. |
| 9,110,505 | B2 | 8/2015 | Mastandrea |
| 9,711,060 | B1 | 7/2017 | Lusted et al. |
| 10,139,906 | B1* | 11/2018 | Bai .................... G06F 3/014 |
| 2003/0116596 | A1* | 6/2003 | Terasawa ............ A44C 5/0007 224/179 |
| 2003/0214481 | A1 | 11/2003 | Xiong |
| 2005/0052412 | A1 | 3/2005 | McRae et al. |
| 2006/0103634 | A1 | 6/2006 | Kim et al. |
| 2007/0030246 | A1 | 2/2007 | Tremblay et al. |
| 2009/0096746 | A1 | 4/2009 | Kruse et al. |
| 2009/0153365 | A1 | 6/2009 | Salsedo et al. |
| 2009/0278798 | A1 | 11/2009 | Kim et al. |
| 2009/0287898 | A1 | 11/2009 | Kim et al. |
| 2010/0103106 | A1 | 4/2010 | Chui |
| 2010/0231505 | A1 | 9/2010 | Iwata |
| 2011/0210931 | A1 | 9/2011 | Shai |
| 2011/0213664 | A1 | 9/2011 | Osterhout et al. |
| 2013/0151960 | A1 | 6/2013 | Wiertlewski et al. |
| 2013/0162415 | A1 | 6/2013 | Kim et al. |
| 2014/0063060 | A1 | 3/2014 | Maciocci et al. |
| 2015/0248160 | A2 | 9/2015 | Provancher et al. |
| 2015/0277559 | A1 | 10/2015 | Vescovi et al. |
| 2016/0278665 | A1 | 9/2016 | Ferreira et al. |
| 2016/0287165 | A1 | 10/2016 | Abreu |
| 2016/0295989 | A1 | 10/2016 | Hakeem et al. |
| 2016/0313798 | A1 | 10/2016 | Connor |
| 2017/0003762 | A1 | 1/2017 | Ishii et al. |
| 2017/0045948 | A1 | 2/2017 | Nattukallingal |
| 2017/0090666 | A1 | 3/2017 | Pahud et al. |
| 2017/0143087 | A1 | 5/2017 | Cunningham |
| 2017/0188947 | A1 | 7/2017 | Connor |
| 2017/0192493 | A1 | 7/2017 | Ofek et al. |
| 2017/0212552 | A1 | 7/2017 | Stotler |
| 2017/0212589 | A1 | 7/2017 | Domenikos et al. |
| 2017/0235332 | A1 | 8/2017 | Von Badinski et al. |
| 2017/0277367 | A1 | 9/2017 | Pahud et al. |
| 2017/0296363 | A1 | 10/2017 | Yetkin et al. |
| 2017/0330471 | A1 | 11/2017 | Subiakto |
| 2017/0357320 | A1 | 12/2017 | Chaudhri et al. |
| 2017/0367590 | A1 | 12/2017 | Sebe et al. |
| 2018/0286189 | A1 | 10/2018 | Motamedi et al. |

FOREIGN PATENT DOCUMENTS

| | | |
|---|---|---|
| CN | 105739612 A | 7/2016 |
| CN | 105739676 A | 7/2016 |
| CN | 106155306 A | 11/2016 |
| JP | 2001104256 A | 4/2001 |
| JP | 2008171409 A | 7/2008 |
| JP | 2014142751 A | 8/2014 |
| JP | 2015521303 A | 7/2015 |
| JP | 2015219887 A | 12/2015 |
| JP | 2016033815 A | 3/2016 |
| JP | 2016118929 A | 6/2016 |
| KR | 1020140016122 A | 2/2014 |
| WO | 2012176610 A1 | 12/2012 |

OTHER PUBLICATIONS

Girard et al., HapTip: Displaying Haptic Shear Forces at the Fingertips for Multi-Finger Interaction in Virtual Environments, Frontiers in ICT, vol. 3, Article 6, Apr. 2016, 15 pages.

Aoki et al., Wearable Haptic Device to Present Contact Sensation Based on Cutaneous Sensation Using Thin Wire, Ace 2009, Oct. 29-Oct. 31, 2009, Athens, Greece.

Shilkrot et al., A Comprehensive Survey of Finger Augmentation Devices, ACM Computing Surveys, vol. 48, No. 2, Article 30, Publication date: Nov. 2015.

* cited by examiner

FINGER DEVICES WITH ADJUSTABLE HOUSING STRUCTURES

This application is a continuation of U.S. patent application Ser. No. 17/465,579, filed Sep. 2, 2021, which claims the benefit of provisional patent application No. 63/078,216, filed Sep. 14, 2020, which are hereby incorporated by reference herein in their entireties.

FIELD

This relates generally to electronic devices, and, more particularly, to finger-mounted electronic devices.

BACKGROUND

Electronic devices such as computers can be controlled using computer mice and other input accessories. Input accessories can be used to control content that is displayed on a display and to take other actions. Some input accessories for computer systems may be cumbersome, uncomfortable, or unable to accommodate different users.

SUMMARY

A system may include a finger device that is worn on a user's finger. The finger device has sensor circuitry in a housing. The sensor circuitry may include a strain gauge, accelerometer, displacement sensor, and/or other sensor circuitry to detect finger input as the housing is moved by the finger. Wireless communications circuitry may be used to supply the finger input to other devices in the system such as a head-mounted device or other electronic device. During operation, finger input may be used to manipulate content displayed by the head-mounted device or other equipment in the system.

The finger device housing may include an upper housing portion that extends across a top of the finger and first and second side housing portions that extend down respective first and second sides of the finger. One or more sensors (e.g., a force sensor, displacement sensor, etc.) may be located in the side housing portions and may be configured to measure movements of the sides of the finger as the finger contacts an external surface and makes other finger movements.

To ensure that the sensors are appropriately positioned relative to the sides of the finger, one or more adjustable structures may be used to adjust the position of the first and second side housing portions relative to the upper housing portion. The adjustable structures may include an elastomeric band, a drawstring, a ratchet mechanism, a scissor mechanism, and/or other adjustable structures that allow the position of the side housing portions and associated sensors to be adjusted.

DETAILED DESCRIPTION

Figure 1:
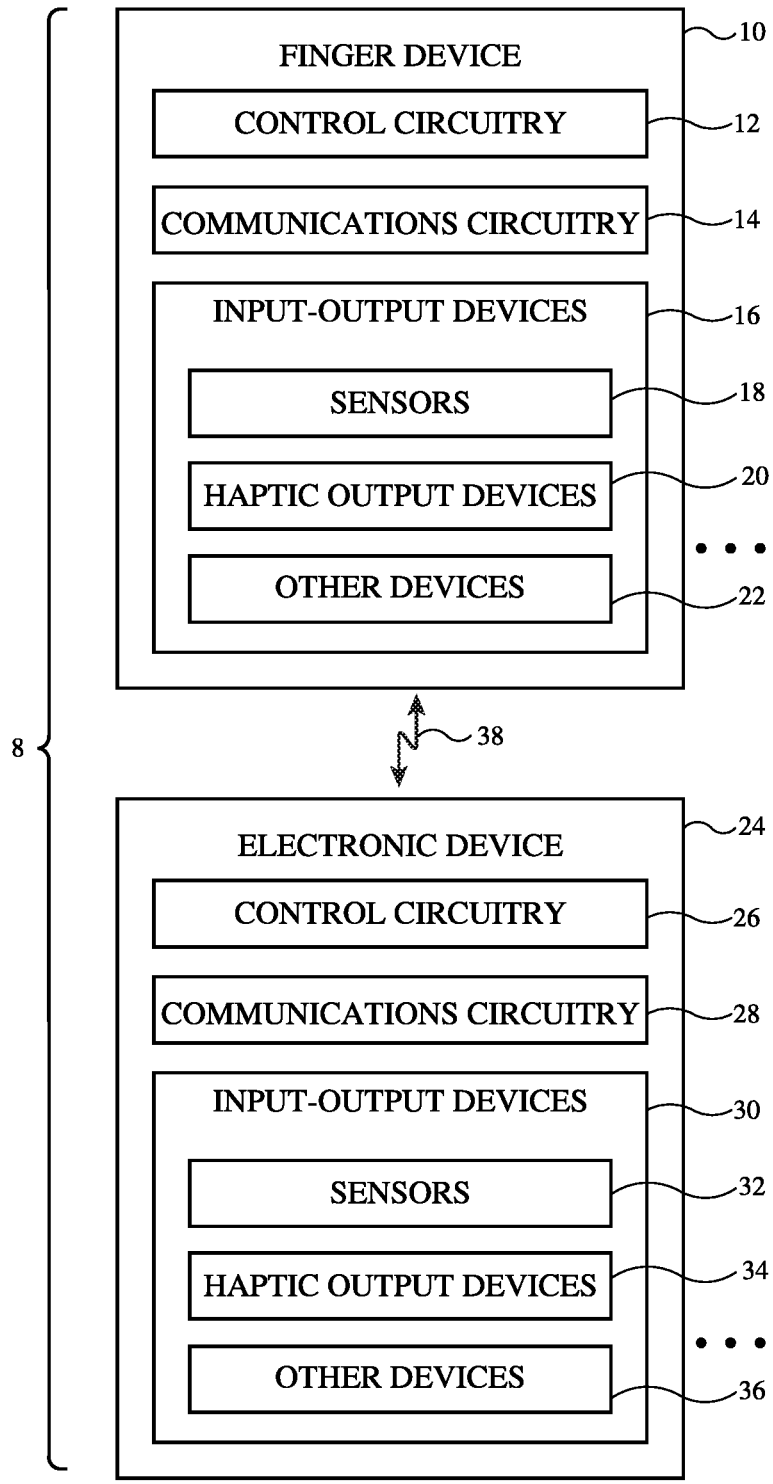
FIG. 1 is a schematic diagram of an illustrative system with a finger device in accordance with an embodiment.

Electronic devices that are configured to be mounted on the body of a user may be used to gather user input and to provide a user with output. For example, electronic devices that are configured to be worn on one or more of a user's fingers, which are sometimes referred to as finger devices or finger-mounted devices, may be used to gather user input and to supply output. A finger device may, as an example, include an inertial measurement unit with an accelerometer for gathering information on figure motions such as finger taps or free-space finger gestures, may include force sensors for gathering information on normal and shear forces in the finger device and the user's finger, may include a displacement sensor, force sensor, or other sensor for measuring movements of the sides of the finger as the finger contacts an external surface, and may include other sensors for gathering information on the interactions between the finger device (and the user's finger on which the device is mounted) and the surrounding environment. The finger device may include a haptic output device to provide the user's finger with haptic output and may include other output components.

One or more finger devices may gather user input from a user. The user may use finger devices in operating electronic devices. For example, a finger device may be used as a controller for a virtual reality or mixed reality device (e.g., head-mounted equipment such as glasses, goggles, a helmet, or other device with a display). During operation, the finger devices may gather user input such as information on interactions between the finger device(s) and the surrounding environment (e.g., interactions between a user's fingers and the environment, including finger motions and other interactions associated with virtual content displayed for a user). The user input may be used in controlling visual output on the display. Corresponding haptic output may be provided to the user's fingers using the finger devices. Haptic output may be used, for example, to provide the fingers of a user with a desired texture sensation as a user is touching a real object or as a user is touching a virtual object. Haptic output can also be used to create detents and other haptic effects.

Finger devices can be worn on any or all of a user's fingers (e.g., the index finger, the index finger and thumb, three of a user's fingers on one of the user's hands, some or all fingers on both hands, etc.). To enhance the sensitivity of a user's touch as the user interacts with surrounding objects, finger devices may have inverted U shapes or other configurations that allow the finger devices to be worn over the top and sides of a user's finger tips while leaving the user's finger pads exposed. This allows a user to touch objects with the finger pad portions of the user's fingers during use. If desired, finger devices may be worn over knuckles on a user's finger, between knuckles, and/or on other portions of a user's finger. Finger devices may have a single segment (e.g., a single housing that fits over the end of a user's finger) or may have multiple segments (e.g., multiple housing portions that are flexibly coupled to each other so that they may be worn on respective segments of a user's finger). One or more finger devices may be worn at a time. The use of a finger device that is worn on a user's fingertip is sometimes described herein as an example.

Users can use finger devices to interact with any suitable electronic equipment. For example, a user may use one or more finger devices to interact with a virtual reality or mixed reality system (e.g., a head-mounted device with a display), to supply input to a desktop computer, tablet computer, cellular telephone, watch, ear buds, or other accessory, or to interact with other electronic equipment.

FIG. 1 is a schematic diagram of an illustrative system of the type that may include one or more finger devices. As shown in FIG. 1, system 8 may include electronic device(s) such as finger device(s) 10 and other electronic device(s) 24. Each finger device 10 may be worn on a finger of a user's hand. Additional electronic devices in system 8 such as devices 24 may include devices such as a laptop computer, a computer monitor containing an embedded computer, a tablet computer, a desktop computer (e.g., a display on a stand with an integrated computer processor and other computer circuitry), a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, device 10 is a finger-mounted device having a finger-mounted housing with a U-shaped body that grasps a user's finger or a finger-mounted housing with other shapes configured to rest against a user's finger and device(s) 24 is a cellular telephone, tablet computer, laptop computer, wristwatch device, head-mounted device, a device with a speaker, and/or other electronic device (e.g., a device with a display, audio components, and/or other output components, equipment that includes multiple devices such as a cellular telephone or computer that serves as a host and a head-mounted device that provides display functionality for the host, etc.). A forger device with a U-shaped housing may have opposing left and right sides that are configured to receive a user's finger and a top housing portion that couples the left and right sides and that overlaps the user's fingernail.

Devices 10 and 24 may include control circuitry 12 and 26. Control circuitry 12 and 26 may include storage and processing circuitry for supporting the operation of system 8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). Devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors (e.g., two-dimensional touch sensors), optical sensors such as optical sensors that emit and detect light, ultrasonic sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as sensors for measuring blood oxygen content and heart rates sensors, radio-frequency sensors (e.g., sensors that gather position information, three-dimensional radio-frequency images, and/or other information using radar principals or other radio-frequency sensing, sensors that detect position, orientation, and/or motion relative to other objects using Bluetooth® positioning techniques or using Ultra-wideband positioning techniques), muscle activity sensors (EMG) for detecting finger actions, optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors, gas sensors, and/or other sensors. In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or finger device or other suitable rotary button that rotates and that optionally can be depressed to select items of interest). Alphanumeric keys and/or other buttons may be included in devices 16 and/or 30.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger pulp. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as displays (e.g., in device 24 to display images for a user), status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals (e.g., wireless power transmitting coils and wireless power receiving coils, capacitive electrodes for wireless power transmission and/or wireless power reception, etc.).

Figure 2:
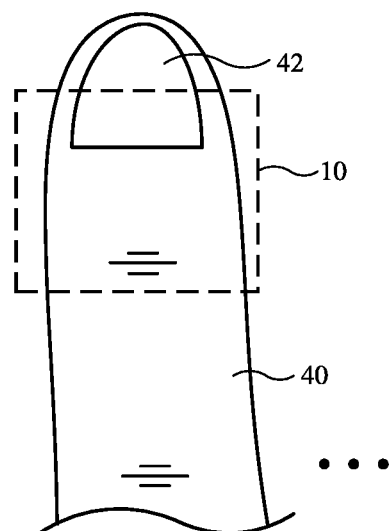
FIG. 2 is a top view of an illustrative finger of a user on which a finger device has been placed in accordance with an embodiment.

FIG. 2 is a top view of a user's finger (finger 40) and an illustrative finger-mounted device 10. As shown in FIG. 2, device 10 may be formed from a finger-mounted unit that is mounted on or near the tip of finger 40 (e.g., partly or completely overlapping fingernail 42). If desired, device 10 may be worn elsewhere on a user's fingers such as over a knuckle, between knuckles, etc. Configurations in which a device such as device 10 is worn between fingers 40 and/or in which a device such as device 10 has a housing configured to be worn on other body parts of a user may also be used.

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in a housing for a fingertip-mounted unit) and/or may include circuitry that is coupled to a fingertip structure (e.g., by wires from an associated wrist band, glove, fingerless glove, etc.). Configurations in which devices 10 have bodies that are mounted on individual user fingertips are sometimes described herein as an example.

Figure 3:
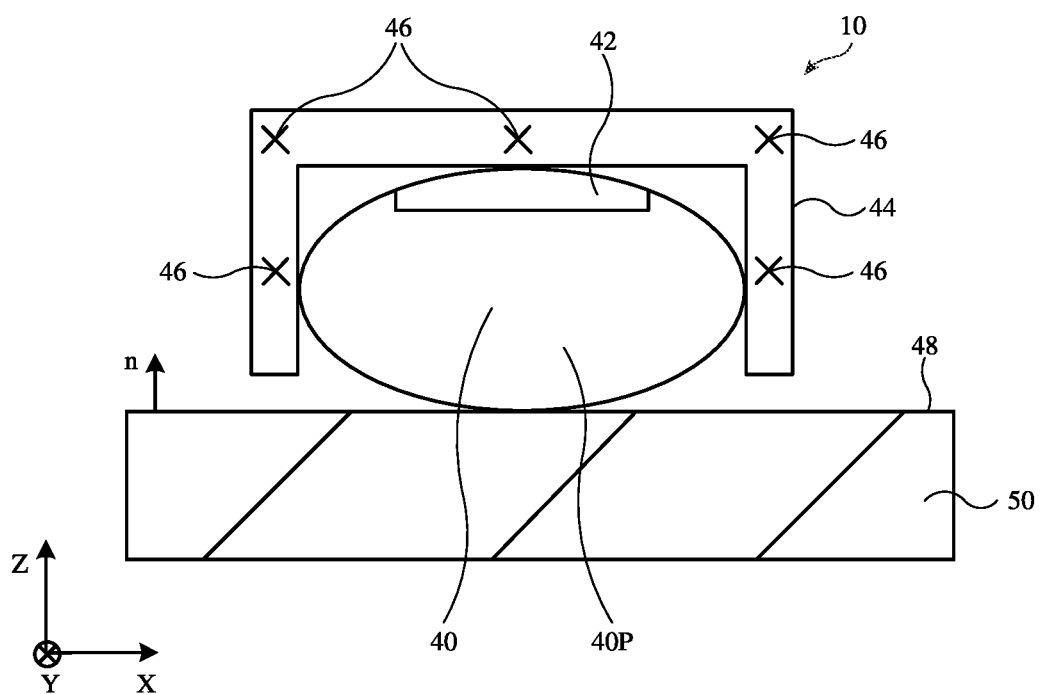
FIG. 3 is a cross-sectional side view of an illustrative finger device on the finger of a user in accordance with an embodiment.

FIG. 3 is a cross-sectional side view of an illustrative finger device (finger-mounted device) 10 showing illustrative mounting locations 46 for electrical components (e.g., control circuitry 12, communications circuitry 14, and/or input-output devices 16) within and/or on the surface(s) of finger device housing 44. These components may, if desired, be incorporated into other portions of housing 44. Housing 44 may be formed from metal (e.g., sheet metal or any other suitable type of metal), glass, plastic, ceramic, fabric, leather, other materials, and/or a combination of any two or more of these materials. Finger device housing structures that are formed from fabric may include one or more pockets for holding sensors, printed circuits, control circuits, magnets, output devices, and/or other structures or electrical components.

As shown in FIG. 3, housing 44 may have a U shape (e.g., housing 44 may be a U-shaped housing structure that faces downwardly and covers the upper surface of the tip of user finger 40 and fingernail 42). During operation, a user may press against structures such as structure 50. As the bottom of finger 40 (e.g., finger pulp or finger pad 40P) presses against surface 48 of structure 50, the user's finger may compress and force portions of the finger outwardly against the sidewall portions of housing 44 (e.g., for sensing by force sensors, displacement sensors, or other sensors mounted to the side portions of housing 44). Lateral movement of finger 40 in the X-Y plane may also be sensed using force sensors or other sensors on the sidewalls of housing 44 or other portions of housing 44 (e.g., because lateral movement will tend to press portions of finger 40 against some sensors more than others and/or will create shear forces that are measured by force sensors that are configured to sense shear forces).

Ultrasonic sensors, optical sensors, inertial measurement units, strain gauges and other force sensors, radio-frequency sensors, and/or other sensors may be used in gathering sensor measurements indicative of the activities of finger 40. If desired, these sensors may also be used in mapping the contours of three-dimensional objects (e.g., by time-of-flight measurements and/or other measurements). For example, an ultrasonic sensor such as a two-dimensional image sensor or an ultrasonic sensor with a single ultrasonic transducer element may emit free-space ultrasonic sound signals that are received and processed after reflecting off of external objects. This allows a three-dimensional ultrasonic map to be generated indicating the shapes and locations of the external objects.

In some configurations, finger activity information (position, movement, orientation, etc.) may be gathered using sensors that are mounted in external electronic equipment (e.g., in a computer or other desktop device, in a head-mounted device or other wearable device, and/or in other electronic device 24 that is separate from device 10). For example, optical sensors such as images sensors that are separate from devices 10 may be used in monitoring devices 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices such as light-emitting diodes and/or lasers. The light-emitting devices may be arranged in an asymmetric pattern on housing 44 and may emit light that is detected by an image sensor, depth sensor, and/or other light-based tracking sensor circuitry in device 24. By processing the received patterned of emitted light, device 24 can determine the position, orientation, and/or motion of device 10.

Tracking can also be performed that involves extrapolating from a known body part orientation (e.g., a finger orientation) to produce orientation information on other body parts (e.g., wrist and/or arm orientation estimated using inverse kinematics). Visual odometry sensors may, if desired, be included in devices 10. These sensors may include image sensors that gather frames of image data of the surroundings of devices 10 and may be used in measuring position, orientation, and/or motion from the frame of image data. Lidar, ultrasonic sensors oriented in multiple directions, radio-frequency tracking sensors, and/or other finger device tracking arrangements may be used, if desired. In some arrangements, user input for controlling system 8 can include both user finger input and other user input (e.g., user eye gaze input, user voice input, etc.). For example, gaze tracking information such as a user's point-of-gaze measured with a gaze tracker can be fused with finger input when controlling device 10 and/or devices 24 in system 8. The finger input may include information on finger orientation, position, and/or motion and may include information on how forcefully a finger is pressing against surfaces (e.g., force information).

The sensors in device 10 may, for example, measure how forcefully a user is moving device 10 (and finger 40) against surface 48 (e.g., in a direction parallel to the surface normal n of surface 48 such as the –Z direction of FIG. 3) and/or how forcefully a user is moving device 10 (and finger 40) within the X-Y plane, tangential to surface 48. The direction of movement of device 10 in the X-Y plane and/or in the Z direction can also be measured by the force sensors and/or other sensors 18 at locations 46.

Structure 50 may be a portion of a housing of device 24, may be a portion of another device 10 (e.g., another housing 44), may be a portion of a user's finger 40 or other body part, may be a surface of a real-world object such as a table, a movable real-world object such as a bottle or pen, or other inanimate object external to device 10, and/or may be any other structure that the user can contact with finger 40 while moving finger 40 in a desired direction with a desired force. Because motions such as these can be sensed by device 10, device(s) 10 can be used to gather pointing input (e.g., input moving a cursor or other virtual object on a display such as a display in devices 36), can be used to gather tap input, swipe input, pinch-to-zoom input (e.g., when a pair of devices 10 is used), or other gesture input (e.g., finger gestures, hand gestures, arm motions, etc.), and/or can be used to gather other user input.

In general, user input gathered by device 10 may be used in controlling any suitable operations in system 8. As an example, system 8 (e.g., one or more devices such as device 24 and/or other equipment in system 8) may change the content displayed for a user by a display device (e.g., a head-mounted display in a head-mounted device or other display) in response to the user input. A pointer may be moved within a displayed image (e.g., to point to a virtual object or real-world object in the user's field of view), lines may be drawn by moving a pointer or virtual paintbrush, content can be scrolled (e.g., in response to user scroll up and scroll down commands received by monitoring deformation of the item), etc. Highlight regions (e.g., a computer-generated visual highlighting element such as a ring, enlarged area, brightened or darkened area, etc.) may also be moved in response to user input. User input may be used to direct system 8 to select highlighted items (e.g., to launch an application, to select media for playback, to perform a file action such as deleting, copying, renaming, etc.). If desired, user input may be used to change pages of displayed content (e.g., to advance through pages in a visual presentation, to move through the pages of a book, etc.). User input may also be used to adjust audio settings, to select a media track, to perform fast forward, reverse, pause, stop, and play operations, and/or to otherwise control the playback of media content containing video, audio, and/or haptic feedback. System 8 may have user adjustable settings such as account settings, user playback settings, and/or other settings. User input from device 10 may be used in adjusting these settings and/or other adjustable parameters in system 8. Device 10 may, as an example, provide finger input information directly to device 24 (e.g., a head-mounted display device) or may provide finger input information to a first device (e.g., a computer or cellular telephone serving as a host) while the first device uses a display in a second device (e.g., a display in a head-mounted device) to display content in response to the finger input information.

If desired, finger device 10 may be placed on a user's finger by pressing housing 44 into place over the top of the tip of the finger. This type of arrangement, which may sometimes be referred to as a press-fit or friction-fit arrangement, may accommodate a range of finger sizes, particularly in configurations in which housing 44 has portions that deform (e.g., by flexing). When it is desired to remove device 10 from the user's finger, housing 44 may be pulled off of the tip of the user's finger.

Another illustrative arrangement involves providing device 10 with adjustable housing structures such as one or more hinges or other structures that allow device 10 to fold and unfold. When it is desired to attach device 10 to the user's finger, device 10 can be folded into its folded state so that device 10 squeezes inwardly against the sides of the user's finger. When it is desired to remove device 10 from the user's finger, device 10 can be unfolded and thereby freed from the finger.

Figure 4:
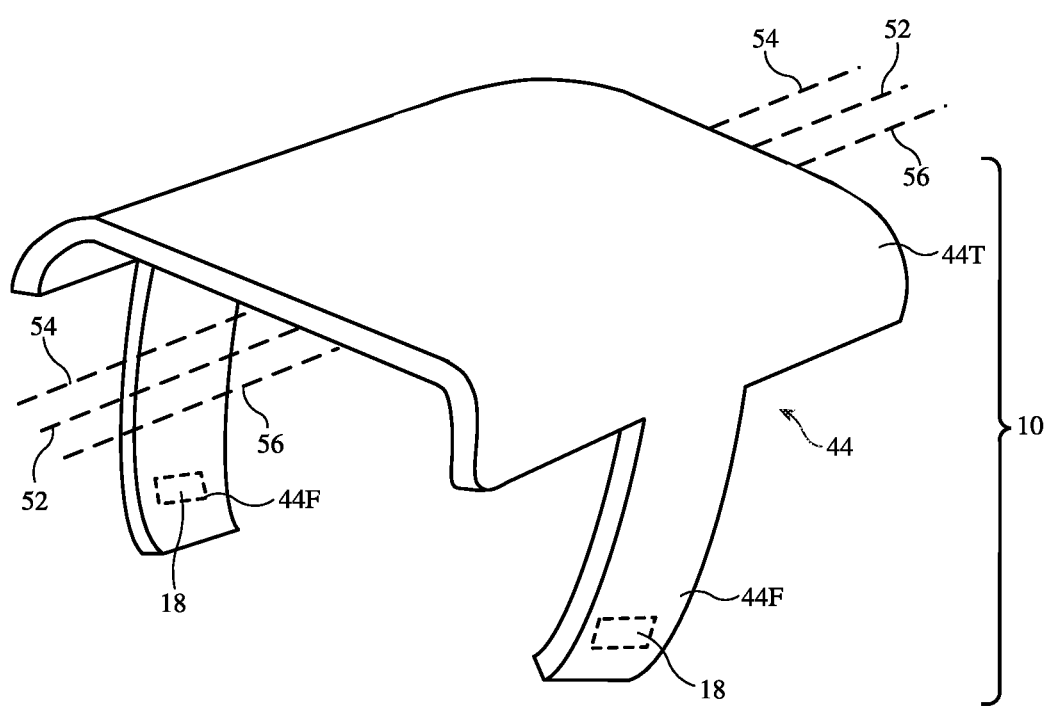
FIG. 4 is a perspective view of an illustrative finger device with a hinge in accordance with an embodiment.

FIG. 4 is a perspective view of finger device 10 in an illustrative configuration in which device 10 is foldable or flexible. In the example of FIG. 4, housing 44 of device 10 has an upper housing portion 44T that extends across the upper (top) portion of the user's finger and has opposing left and right side housing portions 44F that respectively press against the left and right sides of the user's finger.

In one illustrative arrangement, housing 44 may be formed from an elastomeric material such as elastomeric silicone. The elastomeric material may be overmolded onto or otherwise attached to a rigid core (e.g., a rigid plastic core) that spans continuously across side housing portions 44F and upper housing portion 44T or that is located only in certain portions of housing 44 such as side portions 44F. The plastic core may be deformable or may be biased inwardly (e.g., side portions 44F may be biased towards one another). Side portions 44F may, if desired, be tapered to be wider near the top of the user's finger (e.g., near upper housing portion 44T) and narrower near the bottom of the user's finger (e.g., near sensors 18) so that the lower end of side housing portions 44T is more flexible than the upper end of side housing portions 44T. This type of tapered geometry combined with the elasticity of the elastomeric material provides a clamping force that pulls side portions 44F inwardly towards the user's finger.

In another illustrative arrangement, hinge structures formed from one or more hinges may be provided in housing 44 to allow housing 44 to fold and unfold.

As a first example, a single hinge may be formed along the center of housing portion 44T to allow housing 44 to fold and unfold by rotation about rotational (fold) axis 52.

As a second example, a pair of parallel hinges may be formed in housing 44. A first of the hinges may extend along first fold axis (hinge axis) 54 and a second of the hinges may extend along a parallel fold axis such as second fold axis (hinge axis) 56. In this type of arrangement, housing 44 may fold along both axis 54 and axis 56. In some configurations, the hinges may include interlocking elements that impart rotational friction (e.g., the hinges may be friction hinges) to help lock the fold position of device 10. In other configurations, rotational friction from the hinges may be reduced.

If desired, side housing portions 44F may respectively include or be coupled to a pair of protrusions on upper housing portion 44T. When the user wishes to open housing 44, the user may squeeze the protrusions towards one another, thereby causing side housing portions 44F to rotate outwardly (away from one another) so that a user can insert his or her finger in housing 44. When the protrusions are released, side housing portions 44F may rotate inwardly to clamp onto the user's finger.

In general, a single hinge, a pair of hinges, or three or more hinges (e.g., hinges along axes 52, 54, and 56 of FIG. 4 or other suitable locations) or other foldable structures may be provided in housing 44 to allow device 10 to fold (and unfold). Configurations in which housing 44 folds about a single hinge may sometimes be described herein as an example. This is illustrative. Any suitable hinge structures may be used, if desired.

If desired, adjustable housing structures for device 10 may include straps that extend partially or fully around the circumference of the finger (e.g., straps that are fully flexible or straps that are stiff and straight in one configuration and that curve inward towards one another when bent), straps that attach to one another with a buckle, clasp, magnets, and/or other structures, etc. In another configuration, a single strap may extend from one side portion 44F to the opposing side portion 44F. The single strap may be detachably coupled to one or both of side portions 44F and/or may loop through an opening in side portion 44F and fold back on itself (e.g., may attach to itself with a hook and loop fastener or other attachment structure). Ratcheting structures, springs, tensioning structures, sliders, and/or other adjustable structures may be incorporated into housing 44 to allow a user to fit device 10 properly on the user's finger. Sliders may allow for continuous adjustment of size, or sliders may have detents that allow for adjustment between discrete sizes.

In addition to providing sufficient clamping force to hold device 10 on the user's finger, the adjustable housing structures in device 10 may be used to ensure that the sensors in device 10 are appropriately positioned relative to the user's finger. This allows device 10 to accommodate a range of different finger sizes without sacrificing sensor sensitivity.

Figure 5:
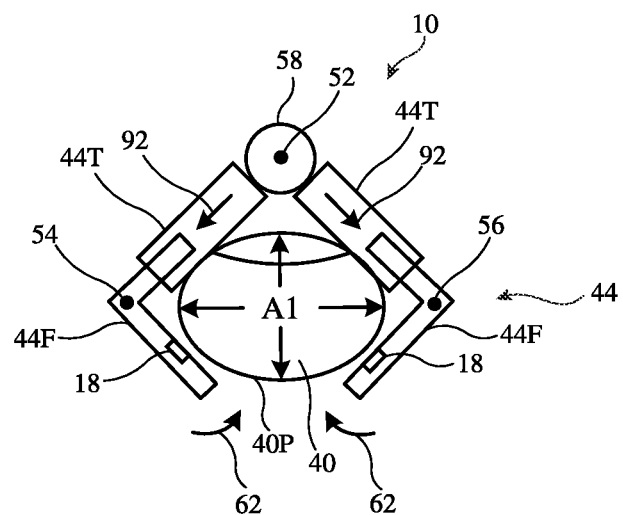
FIG. 5 is a cross-sectional side view of an illustrative finger device with adjustable housing structures for accommodating a first finger size in accordance with an embodiment.
Figure 6:
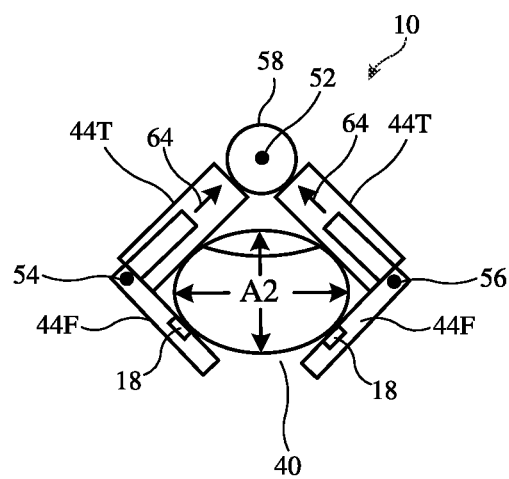
FIG. 6 is a cross-sectional side view of an illustrative finger device with adjustable housing structures for accommodating a second finger size in accordance with an embodiment

FIGS. 5 and 6 are cross-sectional side views of device 10 showing how the adjustable housing structures in device 10 may be adjusted to ensure that sensors 18 are placed appropriately relative to fingers of different sizes. As shown in FIG. 5, device 10 may include adjustable housing structures 44 such as upper housing portion 44T and left and right side housing portions 44F. As discussed in connection with FIG. 4, device 10 may have hinges that allow housing 44 to rotate about one or more hinge axes. For example, housing 44 may include hinge 58 that allows housing 44 to rotate about axis 52. Additionally or alternatively, housing 44 may include hinges that allow housing 44 to rotate about axes 54 and 56.

The hinges of housing 44 allow side portions 44F to rotate inwardly in directions 62. The rotational force in directions 62 ensures that device 10 stays in place on finger 40 while also ensuring that sensors 18 are placed close enough to finger 40. Sensors 18 may, for example, be force sensors, displacement sensors, and/or other sensors that are configured to measure very small movements of the sides of finger 40 as finger 40 moves (e.g., as described in connection with FIG. 3). When device 10 is mounted to finger 40 and side portions 44F are rotated inward, sensors 18 are pressed closer to finger 40 to ensure that the small movements of the sides of finger 40 can be detected by sensors 18.

In addition to pressing sensors 18 against the sides of the user's finger, the adjustable housing structures 44 may be used to ensure that sensors 18 are placed at the appropriate height along the side of the finger. If sensors 18 are too low on the finger (e.g., too close to finger pulp 40P), sensors 18 may inadvertently contact the surface that the user is touching with finger 40 (which could result in a faulty sensor reading in some scenarios) and/or may obstruct finger 40 from contacting the desired surface. If sensors 18 are too high on the finger (e.g., too close to the top of finger 40), sensors 18 may be sensing a part of the finger that does not exhibit sufficient movement relative to the rest of the finger to be detected by sensors 18.

Adjustable housing structures 44 may allow the position of sensors 18 on side portions 44F relative to top portion 44T to be adjustable so that sensors 18 can be placed at the appropriate height along the sides of the user's finger. As shown in FIG. 5, for example, finger 40 may have a first size (e.g., a relatively large size) with cross-sectional area A1. For larger finger sizes, sensors 18 in side portions 44F may need to be further away from top housing portion 44T to reach the appropriate location on the side of the finger. To enlarge the space between top portion 44T and sensors 18 on side portions 44F, side portions 44F may be moved downward and/or outward in directions 92. This allows sensors 18 to extend low enough on a larger finger to sense the appropriate portion of the sides of finger 40.

For smaller finger sizes, such as finger 40 of FIG. 6 with cross-sectional area A2 (e.g., a cross-sectional area smaller than cross-sectional area A1 of FIG. 5), sensors 18 in side portions 44F may need to be closer to top housing portion 44T. To decrease the space between top portion 44T and sensors 18 on side portions 44F, side portions 44F may be moved upward and inward in directions 64. This allows sensors 18 to extend high enough on a smaller finger to sense the appropriate portions of the sides of finger 40.

By combining rotational motion (e.g., in directions 62) with linear motion (e.g., in directions 92 and 64), adjustable housing structures 44 may be able to accommodate different finger sizes (e.g., using linear movements of side portions 44F relative to top portion 44T) while also ensuring that sensors 18 are sufficiently close to the sides of the user's finger (e.g., using rotational movements of side portions 44T about one or more rotational axes such as axes 52, 54, and 56).

FIGS. 7, 8, 9, and 10 are illustrative examples of different adjustable housing structures that may be incorporated into device 10 to accommodate different finger sizes and ensure appropriate positioning of sensors 18 relative to the user's finger. These examples are merely illustrative. If desired, other adjustable structures may be used to adjust the positions of side housing portions 44F relative to upper housing portion 44T. Arrangements in which one or more of the adjustable structures in FIGS. 7, 8, 9, and 10 are combined with one another and/or combined with other adjustable structures may also be used.

Figure 7:
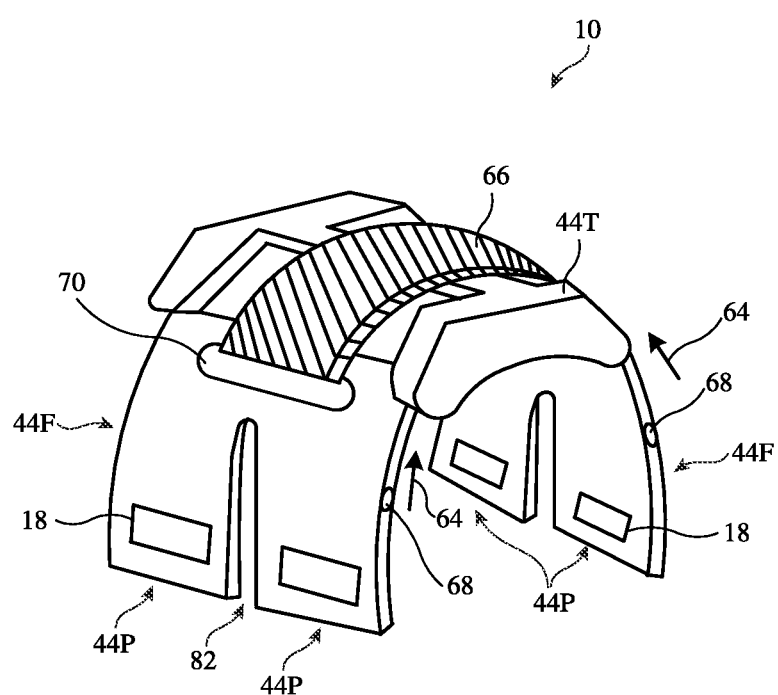
FIG. 7 is a perspective view of an illustrative finger device with adjustable housing structures including an elastomeric band in accordance with an embodiment.

As shown in FIG. 7, housing 44 may include upper housing portion 44T coupled to first and second side housing portions 44F. If desired, each side housing portions 44F may have individually adjustable portions such as ribs 44P separated by a gap such as gap 82. Each side housing portion 44F has first and second individually adjustable ribs 44P in the example of FIG. 7, but there may be three, four, five, or more than five individually adjustable ribs 44P, if desired. Each rib 44P may include one or more sensors 18 that detects movements of the side of the user's fingertip. Providing a gap such as gap 82 between sensors 18 along a given side of the user's finger allows ribs 44P to move relative to one another so that sensors 18 to be individually articulated to the appropriate position against the side of the user's finger, which can help accommodate different finger geometries. This is, however, merely illustrative. If desired, each side portion 44F may not include any gaps and may instead have a single housing structure (e.g., similar to the example of FIG. 4). Arrangements in which side housing portions 44F include individually adjustable ribs 44P are sometimes described herein as an illustrative example.

As discussed in connection with FIGS. 5 and 6, housing 44 may include one or more hinges. For example, hinges 68 may be provided along each side housing portion 44F to allow side housing portions 44F to rotate towards one another when device 10 clamps onto the finger and to rotate away from one another when device 10 is released from the finger. Hinges 68 may, for example, allow for rotation about axes 54 and 56 of FIGS. 5 and 6. Hinges in device 10 such as hinges 68 of FIG. 7 and/or hinge 58 of FIGS. 5 and 6 may include friction hinges, spring-loaded hinges, and/or freely-rotating hinge joints. The example of FIG. 7 in which housing 44 includes hinges 68 is merely illustrative. If desired, device 10 may include additional or different hinges (e.g., hinge 58 of FIGS. 5 and 6) and/or may be free of hinges.

To adjust the position of side housing portions 44F relative to upper housing portion 44T, housing 44 may include an adjustable structure formed from elastomeric material such as elastomeric band 66 (e.g., a band of elastomeric silicone or other elastic material). Elastomeric band 66 may have a first end coupled to first side housing portion 44F and a second end coupled to second side housing portion 44F. Elastomeric band 66 may extend across upper housing portion 44T and may be attached to side portions 44F by looping through an opening such as opening 70 in each of side portions 44F. This is merely illustrative. If desired, elastomeric band 66 may be coupled to side housing portions 44F using adhesive, overmolding, and/or any other suitable attachment means.

The spring force from elastomeric band 66 may help pull side housing portions 44F towards upper housing portion 44T in directions 64. In arrangements where hinges 68 are present in housing 44 and include spring-loaded hinges, hinges 68 may provide additional spring force in directions 64 and/or torque in directions 62 of FIG. 5. Housing 44 may include one or more detents that holds housing 44 in an open position (with side housing portions 44F rotated away from one another). The detent may be released when the user's finger is inserted into housing 44, allowing the spring force from band 66 and/or spring-loaded hinges 68 to pull side housing portions 44F towards one another and towards upper housing portion 44T in directions 64.

Figure 8:
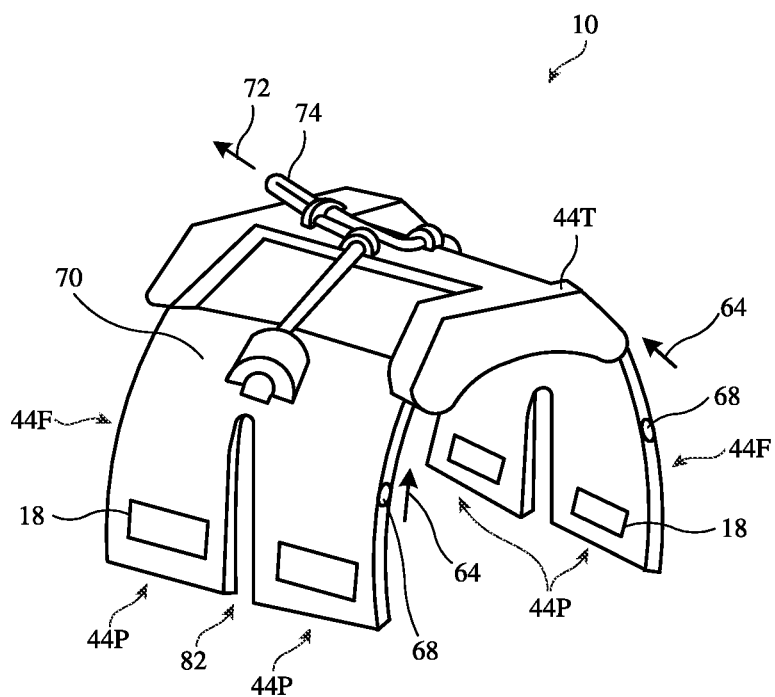
FIG. 8 is a perspective view of an illustrative finger device with adjustable housing structures including a drawstring in accordance with an embodiment.

In the example of FIG. 8, housing 44 includes an adjustable structure formed from string such as drawstring 74 for pulling side housing portions 44F towards upper housing portion 44T. Drawstring 74 may be a strand of material such as polymer, metal, glass, graphite, ceramic, natural materials as cotton or bamboo, or other organic and/or inorganic materials and combinations of these materials. Drawstring 74 may be formed from a bundle of fibers (e.g., yarn) or may be formed from a single monofilament. Drawstring 74 may have a first end coupled to a first of side housing portions 44F and a second opposing end coupled to a second of side housing portions 44F. For example, each end of drawstring 74 may be looped through, tied to, adhesively attached to, stitched to, or otherwise coupled to a respective one of side housing portions 44F.

The central portion of drawstring 74 may be located on upper housing portion 44T. When this central portion is pulled in direction 72, the two opposing ends of drawstring 74 may pull side housing portions 44F towards upper housing portion 44T in directions 64. Drawstring 74 may be pulled directly by a user (e.g., the looped middle portion of drawstring 74 may be pulled by the user's fingers), may be pulled indirectly by a user (e.g., the user may rotate a knob or manipulate some other structure that pulls drawstring 74), and/or may be pulled automatically by an actuator (e.g., an electromechanical actuator that pulls drawstring 74 in response to an electrical control signal). To open housing 44, drawstring 74 may be released and side housing portions 44F may be moved away from one another as the length of string between each side housing portion 44F and upper housing portion 44T expands.

Figure 9:
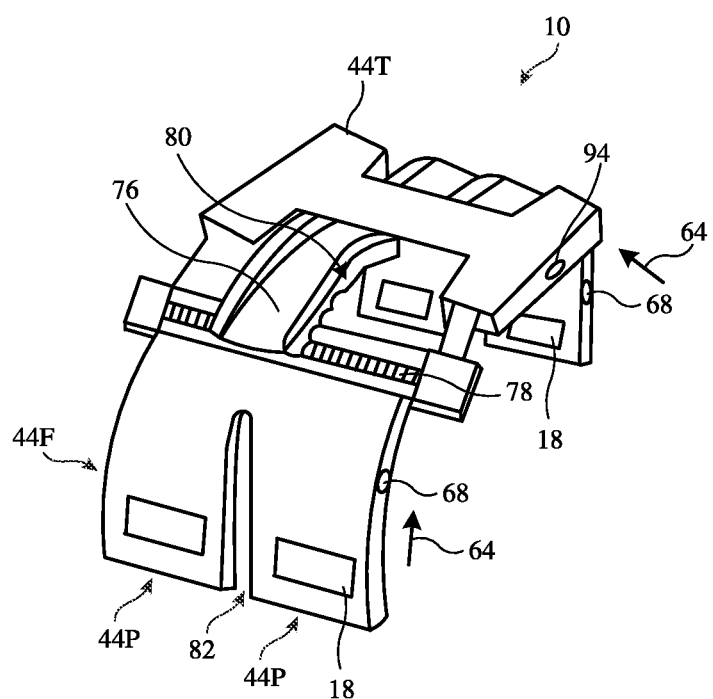
FIG. 9 is a perspective view of an illustrative finger device with adjustable housing structures including a ratchet mechanism in accordance with an embodiment.

In the example of FIG. 9, housing 44 includes adjustable structures such as a ratchet mechanism for adjusting the position of side housing portions 44F relative to upper housing portion 44T. The ratchet mechanism may include a rack such as linear rack 76 with teeth 80. Each side housing portion 44F may be coupled to a pin such as pin 78 that engages teeth 80 to hold side housing portion 44F at a given distance from upper housing portion 44T. For example, a first linear rack 76 and pin 78 may be used to adjust the position of a first side housing portion 44F relative to top housing portion 44T and a second linear rack 76 and pin 78 may be used to adjust the position of a second side housing portion 44F relative to top housing portion 44T.

When a user wishes to make housing 44 smaller, the user may pinch both side housing portions 44F together, causing pins 78 to move along teeth 80 of racks 76 towards upper housing portion 44T in directions 64. Housing 44 may incorporate a release mechanism such as release button 94 that releases the ratchet and opens housing 44 when actuated.

Figure 10:
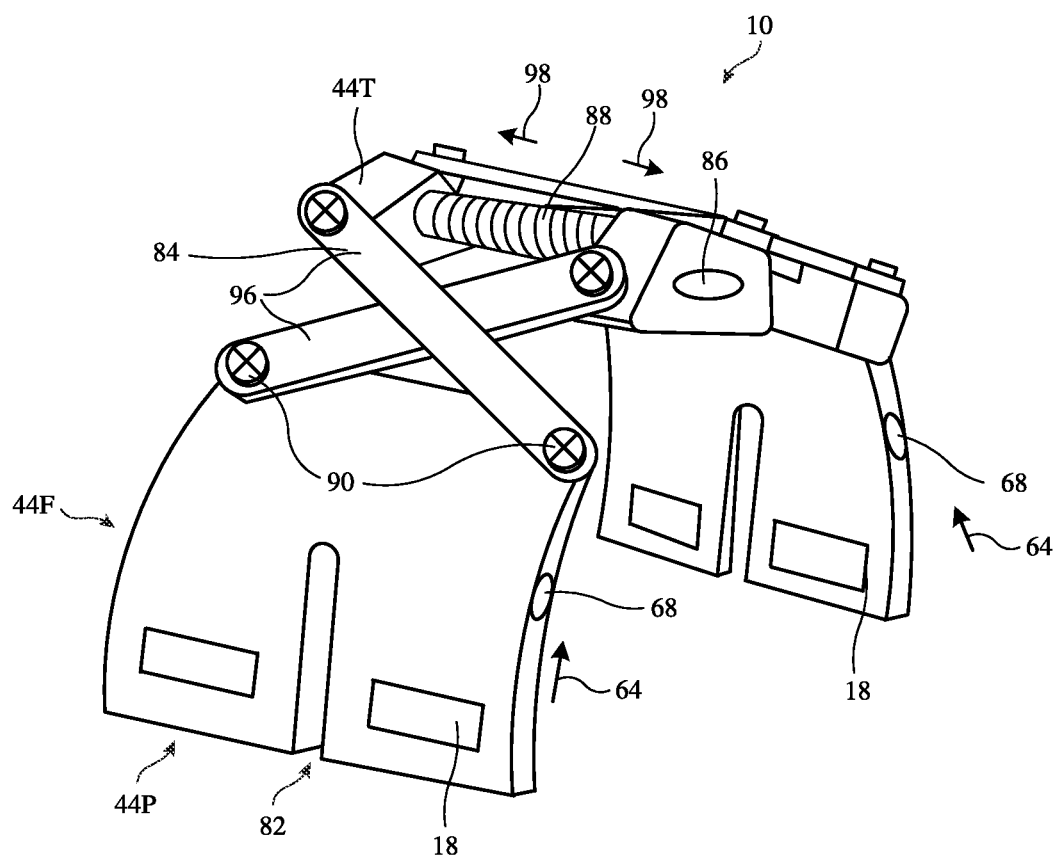
FIG. 10 is a perspective view of an illustrative finger device with adjustable housing structures including a scissor mechanism in accordance with an embodiment.

In the example of FIG. 10, housing 44 includes adjustable structures such as a scissor mechanism for pulling side housing portions 44F towards upper housing portion 44T. The scissor mechanism may include a spring such as spring 88 along upper housing portion 44T and left and right scissor structures 84. Scissor structures 84 may each include first and second linked folding support members 96 that cross over one another at a crossover point where the two support members 96 are linked and can rotate relative to one another. Each scissor structure 84 may be interposed between upper housing portion 44T and a respective one of side housing portions 44F. Attachment structures such as screws 90 may be used to couple the ends of support members 96 to upper housing portion 44T and side housing portions 44F.

Scissor structures 84 may be configured to adjust the position of side housing portions 44F relative to upper housing portion 44T. The movement of scissor structures 84 may be controlled by spring 88. In particular, the upper ends of support members 96 may be coupled to opposing ends of upper housing 44T. Spring 88 may provide a spring force outwardly in directions 98, thereby pushing the upper ends of support members 96 away from one another, which in turn contracts scissor mechanism 84 and pulls side housing portions 44F toward upper housing portion 44T in directions 64. When it is desired to open housing 44, a user may compress spring 88 by pinching the opposing ends of upper housing 44T in locations 86. The compression of spring 88 pulls the upper ends of support members 96 towards one another, which in turn expands scissor mechanism 84 and pushes side housing members 44F away from upper housing portion 44T and away from each other.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A finger device configured to be worn on a finger to control an electronic device with a display, the finger device comprising:
    an upper housing portion;
    first and second side housing portions that extend from the upper housing portion, wherein the first side housing portion has first and second independently adjustable ribs;
    a first sensor in the first rib and a second sensor in the second rib; and
    an adjustable structure that adjusts a position of the first and second side housing portions relative to the upper housing portion.

2. The finger device of claim 1, wherein the adjustable structure comprises an elastomeric band coupled between the first and second side housing portions.

3. The finger device of claim 2, further comprising a spring-loaded hinge in the first side housing portion.

4. The finger device of claim 1, wherein the adjustable structure comprises a drawstring coupled between the first and second side housing portions.

5. The finger device of claim 1, wherein the adjustable structure comprises a ratchet mechanism.

6. The finger device of claim 5, wherein the ratchet mechanism is one of first and second ratchet mechanisms, wherein the first ratchet mechanism adjusts a position of the first side housing portion relative to the upper housing portion and the second ratchet mechanism adjusts a position of the second side housing portion relative to the upper housing portion.

7. The finger device of claim 1, wherein the adjustable structure comprises a scissor mechanism.

8. The finger device of claim 7, wherein the scissor mechanism is one of first and second scissor mechanisms, wherein the first scissor mechanism adjusts a position of the first side housing portion relative to the upper housing portion and the second scissor mechanism adjusts a position of the second side housing portion relative to the upper housing portion.

9. The finger device of claim 1, further comprising a hinge that allows the first and second side housing portions to rotate about a rotational axis.

10. The finger device of claim 1, wherein the first and second sensors are configured to detect movements of a first side of the finger as the finger contacts an external surface.

11. A finger device configured to be worn on a finger to gather finger input, the finger device comprising:
    a U-shaped housing comprising an upper portion coupled between first and second side portions;
    a hinge that allows the first side portion to rotate relative to the second side portion;
    an elastomeric band configured to move the first and second side portions relative to the upper portion, wherein the elastomeric band spans across the upper portion and is coupled between the first and second side portions; and
    a sensor in the first side portion.

12. The finger device of claim 11, wherein the elastomeric band comprises elastomeric silicone.

13. The finger device of claim 11, wherein the sensor is configured to detect movements of a first side of the finger as the finger contacts an external surface.

14. The finger device defined in claim 13 wherein the sensor is selected from the group consisting of: a force sensor and a displacement sensor.

15. The finger device defined in claim 11 wherein the hinge is selected from the group consisting of: a friction hinge, a spring-loaded hinge, and a freely-rotating hinge joint.

16. A finger device configured to be worn on a fingertip without covering a finger pad of the fingertip, comprising:
    an upper housing portion;
    first and second side housing portions that extend from the upper housing portion;
    a sensor in the first side housing portion that measures movements of the fingertip as the finger pad contacts an external surface; and
    an adjustable structure configured to adjust a position of the sensor relative to the fingertip by moving the first side housing portion along a linear axis.

17. The finger device of claim 16, wherein the adjustable structure comprises a silicone band that extends across the upper housing portion and having first and second opposing ends respectively coupled to the first and second side housing portions.

18. The finger device of claim 16, wherein the adjustable structure comprises a drawstring.

19. The finger device of claim 16, wherein the adjustable structure comprises a ratchet mechanism.

20. The finger device of claim 16, wherein the adjustable structure comprises a scissor mechanism.

* * * * *